United States Patent [19]

Dumbaugh, Jr.

[11] 4,102,664

[45] Jul. 25, 1978

[54] METHOD FOR MAKING GLASS ARTICLES WITH DEFECT-FREE SURFACES

[75] Inventor: William H. Dumbaugh, Jr., Painted Post, N.Y.

[73] Assignee: Corning Glass Works, Corning, N.Y.

[21] Appl. No.: 798,022

[22] Filed: May 18, 1977

[51] Int. Cl.$^2$ .................. C03C 19/00; C03C 25/02
[52] U.S. Cl. .................................. 65/23; 65/30 E; 65/31; 156/657; 156/663
[58] Field of Search .................. 65/30 E, 31, 23; 156/630, 633, 657, 663

[56] References Cited

U.S. PATENT DOCUMENTS

| | | | |
|---|---|---|---|
| 3,023,139 | 2/1962 | van Tetterode | 65/31 X |
| 3,771,983 | 11/1973 | Straka | 65/31 |
| 3,791,806 | 2/1974 | Koizumi et al. | 65/30 E X |
| 3,899,314 | 8/1975 | Siegmund | 65/23 |
| 3,926,601 | 12/1975 | Hicks | 65/31 |
| 3,989,495 | 11/1976 | Siegmund | 65/31 |

*Primary Examiner*—Robert L. Lindsay, Jr.

*Attorney, Agent, or Firm*—Clinton S. Janes, Jr.; Clarence R. Patty, Jr.

[57] ABSTRACT

This invention relates to a method for forming glass articles having essentially defect-free surfaces which can be equivalent in smoothness to that achieved in a polishing operation, and which can demonstrate mechanical strength superior to that exhibited by glass articles produced via conventional glass-forming techniques. The method contemplates melting two different glass compositions, one of which is highly soluble in a given solvent and the second of which is relatively insoluble in the same solvent; the molten glasses are simultaneously brought together while in the fluid state to form a laminated glass body wherein the insoluble glass is essentially completely enveloped within the soluble glass; the laminae are fused together at a temperature where the melts are in fluid form to provide an interface therebetween which is free from defects; the laminated article is cooled; and the soluble outer glass layer is dissolved away in an appropriate solvent. An exchange of ions takes place at the interface between the insoluble glass and the soluble outer glass layer.

4 Claims, 1 Drawing Figure

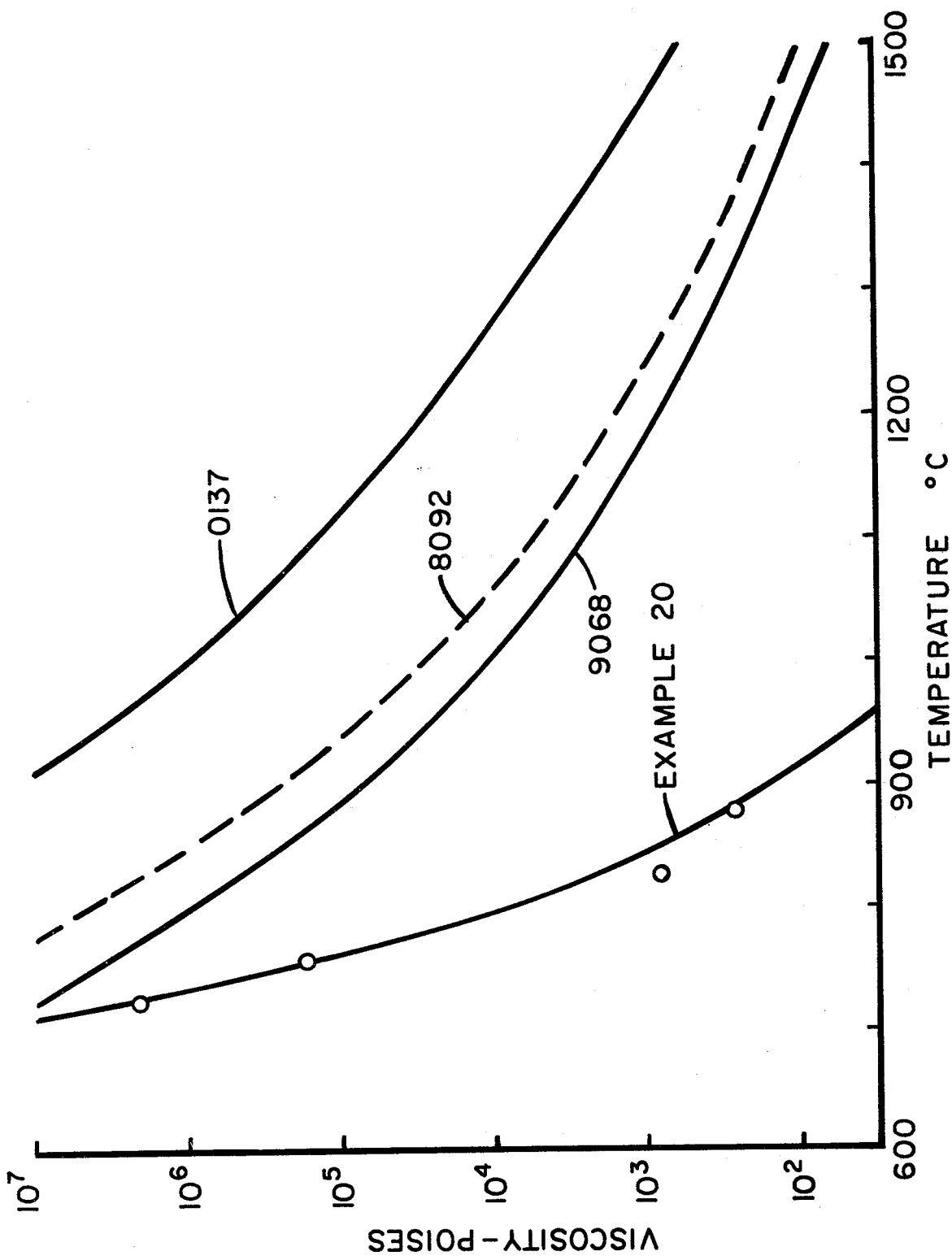

METHOD FOR MAKING GLASS ARTICLES WITH DEFECT-FREE SURFACES

BACKGROUND OF THE INVENTION

Currently, many types of glassware require ground and polished surfaces. Examples of such are ophthalmic lenses, optical instrument lenses, cathode ray tube faceplates, and plate glass. Grinding and polishing adds significantly to the cost of such articles not only because of the space requirements for the necessary equipment but also because of the time and energy that must be expended in carrying out the processes. Consequently, research efforts have been extensive to devise a simpler, less expensive means for preparing articles of equivalent quality.

The well-known process of acid polishing suffices in some instances but is inadequate for many purposes. Moreover, that process is a time consuming, expensive operation which frequently involves a concomitant waste disposal problem.

A further characteristic of glassware which must be given serious consideration is that of mechanical strength and, more particularly, the effect of surface defects on such strength. It is well-recognized in the art that very minute cracks tend to develop in the surface thereof as a glass article is cooled from the softened state, and that such cracks substantially diminish the inherently high strength of a defect-free, pristine glass surface. Again, an acid wash may be helpful or a chemical strengthening procedure may be applied to the article, but such practices add considerably to the manufacturing cost and are useful only in a limited range of glass compositions. Accordingly, a better solution to the problem has been sought.

OBJECTIVE OF THE INVENTION

The primary objective of the invention is to provide a method for forming glass articles having surfaces which are essentially defect free and equivalent in smoothness to a polished surface, the presence of such surface also commonly imparting enhanced mechanical strength to the articles.

SUMMARY OF THE INVENTION

U.S. Pat. Nos. 3,849,097 and 3,737,294 disclose the formation of laminated glass articles wherein the interface between adjacent laminae is essentially defect free. Broadly speaking, those patents describe a three-step method: first, a glass-forming batch of a desired composition is melted for each layer; second, the molten batches are simultaneously brought together while in the fluid state into a laminated glass article; and third, the laminae are fused together at elevated temperatures where the melts are in fluid form such that the interface therebetween is essentially defect free.

As is explained therein the absolute viscosities of the melts for the individual layers are dependent upon the glass shapes to be fabricated. Hence, for example, where tableware is to be formed via sagging of hot laminated sheets into molds, trimming the excess, and then removing the shapes from the molds, viscosities of less than about 5000 poises are preferred. In contrast, where glass tubing or cane is to be drawn, melt viscosities of about 50,000–200,000 poises are frequently employed. Finally, the production of glass sheet utilizing a updraw process will conventionally require a viscosity of between about 100,000–250,000 poises. The viscosity of the melts for adjacent laminae at the laminating temperature may be substantially identical or may exhibit a difference in an amount up to about a factor of six. In a three-ply laminate, the interior layer will preferably have a viscosity two-to-four times that of the outside layers.

The primary objective of those patents was to fabricate high strength laminated articles. That objective was accomplished by using a surface glass having a coefficient of thermal expansion at least $15 \times 10^{-7}/°$ C. less than that of the interior adjacent layer. Consequently, upon cooling the laminated article to room temperature, the surface layer will be placed in compression. There is no discussion, however, of providing a glass shape having a surface that is substantially defect free and equivalent in smoothness to a polished surface.

In the most general terms, the basic method of the instant invention consists of five steps: (1) two batches of distinctly different compositions are melted, one for a glass which is highly soluble in a given solvent and the other for a glass which is relatively insoluble in the same solvent; (2) the molten batches are simultaneously brought together while in the fluid state to form a laminated glass body wherein the insoluble glass is essentially completely encased within the soluble glass; (3) the laminae are fused together at a temperature where the melts are in fluid form to provide an interface therebetween which is defect free; (4) the laminated article is cooled; and (5) the soluble glass layer is dissolved away in an appropriate solvent.

It will be recognized that, where desired, the composite article can be further formed or re-formed. Thus, for example, the laminate can be heated to a temperature at which the glasses demonstrate a viscosity of about $10^{11}$–$10^9$ poises, that is, a temperature between the annealing and softening points, and then pressed, drawn, rolled, or otherwise shaped into a particular geometry.

The invention is founded upon the basic concept of forming a glass body of a desired configuration having the whole body substantially totally enclosed within a skin of a second glass having a composition different from that of the body glass, and thereafter removing the skin glass. Thus, the core or main glass body is not exposed during the initial forming operation (or any other subsequent forming operation) or during the cooling step. Consequently, it is not subject to the development of surface defects conventionally occurring in glass forming operations. Removal of the skin glass leaves an essentially pristine, defect-free surface on the body glass.

A requirement evidently fundamental to the operation of the instant invention is the presence of two glasses having very different solubilities in a given solvent. This difference in solubility will be at least one order of magnitude (10 times) and will, preferably, be greater than two orders of magnitude. Whether a glass be adjudged soluble or insoluble is, of course, dependent upon the solvent selected.

Silicate-based compositions are probably the best known and most widely used glasses commercially. Since such glasses can be, and usually are, designed for resistance to water or dilute acid attack, it is believed to be most practical to select an aqueous or dilute acid type solvent (normally a mineral acid), and then to devise a skin glass that is relatively soluble therein.

It is apparent, however, that one could formulate a body glass which is highly resistant to alkaline attack and a skin glass that is soluble in basic solutions, thereby utilizing an alkaline solution as an operable solvent. Furthermore, inasmuch as silicates are quite soluble in hydrofluoric acid (HF), whereas phosphate-based glasses are relatively insoluble therein, pairs of glass compositions can be formulated utilizing hydrofluoric acid as the solvent. Nevertheless, because the water and dilute acid systems appear to be the most attractive commercially, specific attention will be focussed there.

There are at least three other factors, however, that must be taken into consideration when formulating pairs of glass compositions suitable for the practice of the present invention. These are coefficient of thermal expansion, viscosity, and tendency to crystallize.

The coefficient of thermal expansion of the skin glass from room temperature to the set point of the glass ought not to exceed that of the body glass. Otherwise, tension will develop in the surface layer as the composite cools to room temperature, thereby hazarding spontaneous breakage or spalling. The coefficient of thermal expansion of the skin glass will desirably be somewhat less than that of the body glass, resulting in the development of compressive stresses in the surface layer or cooling. Unless excessive in amount, viz., a difference in expansion coefficient greater than about $50 \times 10^{-7}/°$C., such compressive stresses may be beneficial.

For lamination purposes, that is, for compatible fusion of the molten batches during forming, it is advantageous to have glasses reasonably corresponding in viscosity. Customarily, the lamination proceeds very satisfactorily when the viscosity of the skin glass is equal to or slightly lower than that of the body glass (two-to-four times that of the body glass). Nevertheless, successful combinations have been produced wherein the viscosities of the individual laminae differed by a factor of up to six times in either direction, but such become increasingly difficult to form.

The skin and body glass compositions will preferably be chosen which have liquidus values below the temperature at which lamination is undertaken in order to prevent the onset of devitrification during the forming step. Lamination may be possible when the liquidi are in close proximity of the forming temperature if the rate of devitrification is quite slow.

It will be apparent that, as the molten batches are brought together from their respective melts, care must be taken to avoid inclusions of any nature between the laminae. In other words, precautions conventional in normal laminating practice will be observed.

Shaping of the laminated article can be conducted in any conventional manner. Thus, such well-known forming methods as pressing, press-and-blow, vacuum forming, etc. can be performed in the customary manner. A condition essential to the success of the present invention is, of course, to have the body glass covered with a skin glass during any forming operation.

In accordance with conventional practice, the composite body will be cooled following the forming step. Annealing practices well known to the glassmaking art can, of course, be employed to avoid detrimental strains in the article. Moreover, where desired, the laminated body can be subjected to thermal tempering. The enhancement in mechanical strength resulting therefrom can be maintained even after the soluble surface layer has been removed.

The composite article will be exposed to a selected solvent for solution of the skin glass. Contact may be made through such methods as spraying, washing, or immersion of the article, the specific technique employed is not critical. Rather, the essential criterion is to effect the removal of the skin glass as rapidly as possible without damage to the body glass surface thereby being exposed.

PRIOR ART

It is a well-known practice in the fiber optics art to encase a rod or other body of core glass in a sleeve of cladding glass, to unite the two bodies into a composite, and then to draw the thermally softened composite down to a much smaller size. U.S. Pat. No. 3,989,495 describes a method for making optical prisms wherein this general practice is applied to an enlarged, ground and polished, insoluble glass prism preform. The preform is encased within a soluble glass, the combination thermally softened and drawn to a reduced size with the prism preform being protected from deformation, and the soluble glass thereafter removed to leave the prism body reduced in size, but retaining the true faces and angles originally imparted thereto by grinding and polishing.

In a generally similar manner but for a different product, U.S. Pat. No. 3,926,601 discloses forming glass razor blades by first grinding a desired blade configuration on an enlarged glass preform, thereafter encasing the blade in a soluble glass, then simultaneously heating and drawing the composite down to a predetermined size, and, finally, dissolving away the soluble glass to expose the original blade configuration.

Yet another illustration of the basic concept of drawing and attenuating a glass composite to a reduced size and then removing a soluble glass portion therefrom is in the production of fluidic circuits described in U.S. Pat. No. 3,771,983.

However, although each of the above disclosures utilizes the removal of a soluble glass element as one step of product formation, none has any statement or even a suggestion of bringing streams of molten glass together to form a laminated article, one of said glasses being highly soluble in a given solvent whereas the other glass is very insoluble therein. Rather, each disclosure involved fusing together solid bodies of glass and then dissolving away the soluble glass components.

French Pat. No. 2,309,482 is particularly drawn to the production of ophthalmic lenses having at least one finished surface thereon. One process embodiment of the invention consisted of floating the glass which will comprise the lenses, while said glass is in a fluid state, on a bath of molten metal. The top surface of the floating glass is covered with a thin layer of a second glass which is also in the fluid state, this second glass being relatively soluble in a selected solvent whereas the lens glass is not. The bilayer sheet is then cut and shaped into the desired lens configurations and the soluble glass dissolved away leaving a finished surface on the lens glass.

It is quite apparent that the method described therein does not involve bringing streams of fluid glass together in such a manner that there is at least one inner layer of glass which is encased within a particular glass that is highly soluble in a given solvent. Hence, at best, only one surface of a glass body will have a smooth surface.

DESCRIPTION OF PREFERRED EMBODIMENTS

Tables I-IV record glass compositions prepared to illustrate examples of glasses readily soluble in water or in dilute aqueous mineral acid solutions. Thus, Table I reports alkali metal silicate-based exemplary compositions; Table II lists several metaphosphate-type glasses; Table III recites soluble glasses from the barium borosilicate system; and Table IV provides several borate-based compositions.

Table I records the compositions of the alkali metal silicate glasses as expressed on the oxide basis both in terms of cation percent and weight percent. The actual batch ingredients can comprise any materials, either the oxides or other compounds, which, when melted together, will be converted into the desired oxide in the proper proportions. In the examples reported, the batches were composed of sand with $Li_2CO_3$ and/or $Na_2CO_3$ and/or $K_2CO_3$. The batch ingredients were tumble mixed together, placed in fused silica crucibles, the crucibles covered and then moved to a furnace operating at about 1400° C. After about one hour the batch was transformed into a very fluid melt which was poured into a steel mold to yield a slab about 6 inches × 6 inches × ½ inch. The slab was immediately transferred to an annealer.

Table I also lists determinations of softening point (S.P.) in ° C., annealing point (A.P.) in ° C., strain point (St.P.) in ° C., and coefficient of thermal expansion (Exp.) over the range of 0°–300° C. in terms of $\times 10^{-7}/°$ C., as measured in accordance with techniques conventional in the glass art. Finally, Table I reports the weight loss, expressed in terms of $mg/cm^2$, exhibited by the glasses after immersions of 15 minutes and 30 minutes in distilled water at 95° C.

TABLE I

| | Cation Percent | | | | |
|---|---|---|---|---|---|
| | 1 | 2 | 3 | 4 | 5 |
| $SiO_2$ | 50 | 50 | 50 | 50 | 50 |
| $Li_2O$ | — | — | 25 | 25 | — |
| $Na_2O$ | 50 | — | 25 | — | 25 |
| $K_2O$ | — | 50 | — | 25 | 25 |
| | Weight Percent | | | | |
| | 1 | 2 | 3 | 4 | 5 |
| $SiO_2$ | 66.0 | 56.0 | 72.4 | 66.0 | 60.6 |
| $Li_2O$ | — | — | 8.9 | 8.1 | — |
| $Na_2O$ | 34.0 | — | 18.7 | — | 15.6 |
| $K_2O$ | — | 44.0 | — | 25.9 | 23.8 |
| | 1 | 2 | 3 | 4 | 5 |
| S.P. | 596 | 656 | 530 | 567 | 563 |
| A.P. | 444 | 477 | 399 | 432 | 393 |
| St.P. | 410 | 439 | 374 | 402 | 356 |
| Exp. | 154 | 181 | 138 | 137 | 177 |
| 15 min. | 0.1 | Dissolved | 0.006 | 5.4 | 0.3 |
| 30 min. | 1.2 | — | 0.007 | Dissolved | 110 |

As can be observed from the table, the solubility of the glasses increases as the molecular weight of the alkali metal employed increases. Unfortunately, however, the coefficient of thermal expansion of the glass also rises.

Table II recites several exemplary compositions of metaphosphate-type glasses as expressed on the oxide basis both in terms of cation percent and weight percent. Again, the actual batch ingredients to be utilized to yield the reported glasses are well within the purview of the glass technologist. The phosphorous component was added either as $H_3PO_4$ or $P_2O_5$. Although less expensive as a batch ingredient, $H_3PO_4$ displays the disadvantages of excessive fuming during the melting procedure which is not only a hazard in itself but also requires that allowance in the batch must be made to compensate for such loss.

The batch ingredients were tumble mixed together, placed in 96% $SiO_2$ crucibles, the crucibles covered and then carried to a furnace operating at about 1200° C. After about 0.5 hour, clear, fluid, and fuming melts were poured into steel molds to produce slabs about 6 inches × 6 inches × ½ inch, and the slabs immediately positioned within an annealer.

Table I also records measurements of coefficient of thermal expansion (25°–300° C.) and the percent weight loss (Loss) exhibited by the glasses after immersion in aqueous 6N HCl after four hours at 95° C. These measurements were performed on samples prepared using $P_2O_5$ as a batch material rather than $H_3PO_4$.

TABLE II

| | Cation Percent | | | | | | |
|---|---|---|---|---|---|---|---|
| | 6 | 7 | 8 | 9 | 10 | 11 | 12 |
| $SiO_2$ | 50 | 50 | 50 | 50 | 50 | 50 | 50 |
| CaO | 50 | 40 | 40 | — | 25 | — | — |
| $Li_2O$ | — | 10 | — | — | — | — | — |
| $Na_2O$ | — | — | 10 | — | — | — | — |
| PbO | — | — | — | 50 | 25 | — | 25 |
| ZnO | — | — | — | — | — | 50 | — |
| | Weight Percent | | | | | | |
| | 6 | 7 | 8 | 9 | 10 | 11 | 12 |
| $P_2O_5$ | 71.7 | 73.6 | 71.3 | 38.9 | 50.4 | 63.6 | 48.3 |
| CaO | 28.3 | 23.3 | 22.5 | — | 10.0 | — | — |
| $Li_2O$ | — | 3.1 | — | — | — | — | — |
| $Na_2O$ | — | — | 6.2 | — | — | — | — |
| PbO | — | — | — | 61.1 | 39.6 | — | 37.9 |
| ZnO | — | — | — | — | — | 36.4 | 13.8 |
| Exp. | — | — | 147 | 160 | 120 | — | 127 |
| Loss | 37 | 73 | 27 | 11 | 26 | 100 | 26 |

U.S. application Ser. No. 749,677, filed Dec. 13, 1976 by H. E. Rauscher, discloses glasses within the barium borosilicate system which exhibit very high solubilities in 1N $HNO_3$, i.e., a dissolution rate of at least 0.5 $mg/cm^2$ of exposed surface area per minute at 25° C. Such glasses consist essentially, in weight percent on the oxide basis, of about 38–64% BaO, 0–17% CaO, 0–3% MgO, 49–67% BaO + CaO + MgO, 8–45% $B_2O_3$, 6–34% $SiO_2$, 32–51% $B_2O_3$ + $SiO_2$, with the sum of BaO + CaO + MgO + $B_2O_3$ + $SiO_2$ constituting at least 88% of the total composition. The inclusion of extraneous oxides is noted with specific reference being made to 0–12% $Al_2O_3$, 0–10% $TiO_2$, 0–7% $ZrO_2$, 0–3.5% $Na_2O$, and 0–4% ZnO. The glasses are cited as having coefficients of thermal expansion (0°–300° C.) not exceeding 105 × $10^{-7}/°$ C. and a softening point of at least 645° C. Those glasses have been found to be useful in the instant invention and reference is specifically made to that application for further information regarding their composition and method of preparation.

Table III sets forth several representative examples of those glasses, as expressed on the oxide basis both in terms of cation percent and weight percent, along with measurements of softening point (S.P.), annealing point (A.P.), strain point (St.P.), coefficient of thermal expansion over the range 0°–300° C. ($\times 10^{-7}/°$ C.), and the dissolution rate (Diss.) in 1N $HNO_3$ at 25° C. expressed in terms of $mg/cm^2$ of exposed surface area per minute.

TABLE III

| | Cation Percent | | | | |
|---|---|---|---|---|---|
| | 13 | 14 | 15 | 16 | 17 |
| $SiO_2$ | 23.0 | 22.3 | 20.0 | 22.3 | 26.0 |
| $B_2O_3$ | 46.2 | 44.4 | 40.0 | 44.4 | 52.3 |
| BaO | 30.8 | 29.6 | 20.0 | 29.6 | 21.7 |
| $TiO_2$ | — | 3.7 | — | — | — |
| CaO | — | — | 20.0 | — | — |
| $Na_2O$ | — | — | — | 3.7 | — |
| | Weight Percent | | | | |
| | 13 | 14 | 15 | 16 | 17 |
| $SiO_2$ | 17.9 | 17.3 | 17.7 | 17.3 | 23.3 |
| $B_2O_3$ | 20.8 | 20.0 | 20.5 | 20.0 | 27.1 |
| BaO | 61.0 | 58.8 | 45.2 | 58.8 | 49.6 |

TABLE III-continued

| | | | | | |
|---|---|---|---|---|---|
| TiO$_2$ | — | 3.8 | — | — | — |
| CaO | — | — | 16.5 | — | — |
| ZnO | — | — | — | 3.9 | — |
| S.P. | 681 | 692 | 698 | 672 | 724 |
| A.P. | 597 | 614 | 614 | — | 629 |
| St.P. | 572 | 591 | 591 | — | 601 |
| Exp. | 93.7 | 93.4 | 95.4 | 95.7 | 76.7 |
| Diss. | 17.9 | 3.48 | 7.54 | 16.2 | 1.77 |

As can be observed from the table, the solubilities of these glasses can be very high and the coefficients of thermal expansion are somewhat lower than glasses in the two previously-described composition systems.

The borate-based glass compositions are preferred embodiments of soluble glasses operable in the inventive method. Thus, such glasses demonstrate high solubility coupled with relatively low coefficients of thermal expansion. The low expansion is especially advantageous in permitting skin surface layers to be developed which exhibit compressive stresses when the laminated article is cooled to room temperature.

Table IV records several representative glasses within the borate system, as expressed on the oxide basis both in terms of cation percent and weight percent. Yet again, the actual batch ingredients to be used in producing the recited glasses is well within the skill of the glass technologist. In the examples set out in the table, the following materials were utilized: $H_3BO_3$, $CaCO_3$, $MgCO_3$, $BaCO_3$, ZnO, $Li_2CO_3$, and $Na_2CO_3$. The batch ingredients were ballmilled together, placed in platinum crucibles, the crucibles covered and then inserted into a furnace operating at about 1200° C. After about 0.5–1 hour, a clear, very fluid melt was poured into steel molds to yield slabs about 6 inches × 6 inches × ½ inch which were immediately moved to an annealer.

Table IV also recites measurements of coefficient of thermal expansion over the range 25°–300° C. plus the weight loss in mg/cm$^2$ upon immersion in distilled water for 24 hours at room temperature and at 95° C., and upon immersion in an aqueous 1N HCl solution for 4 hours at room temperature and at 95° C.

TABLE IV

| | Cation Percent | | | | | |
|---|---|---|---|---|---|---|
| | 18 | 19 | 20 | 21 | 22 | 23 |
| B$_2$O$_3$ | 82.4 | 82.3 | 82.3 | 82.3 | 82.3 | 82.3 |
| CaO | 17.6 | 11.8 | 11.8 | 11.8 | 11.8 | 11.8 |
| MgO | — | 5.9 | — | — | — | — |
| BaO | — | — | 5.9 | — | — | — |
| ZnO | — | — | — | 5.9 | — | — |
| Li$_2$O | — | — | — | — | 5.9 | — |
| Na$_2$O | — | — | — | — | — | 5.9 |
| | Weight Percent | | | | | |
| | 18 | 19 | 20 | 21 | 22 | 23 |
| B$_2$O$_3$ | 74.3 | 76.2 | 64.7 | 71.6 | 77.4 | 73.6 |
| CaO | 25.7 | 17.5 | 14.9 | 16.5 | 17.8 | 17.0 |
| MgO | — | 6.3 | — | — | — | — |
| BaO | — | — | 20.4 | — | — | — |
| ZnO | — | — | — | 11.9 | — | — |
| Li$_2$O | — | — | — | — | 4.8 | — |
| Na$_2$O | — | — | — | — | — | 9.4 |
| Exp. | 56.0 | 55.8 | 68.0 | 60.0 | 68.5 | 76.9 |
| H$_2$O-R.T. | 1.7 | 9.9 | 2.3 | 13.7 | 8.1 | — |
| H$_2$O-95° C | 11.4 | 4.4 | 79.4 | 3.7 | 28.5 | 26.9 |
| HCl-R.T. | 13.7 | 8.6 | 14.3 | 25.3 | 28.5 | 10.4 |
| HCl-95° C | 77.7 | 92.4 | 191.4 | 92.4 | 82.0 | 98.6 |

Because of its good stability, relatively low thermal expansion, and high solubility, Example 20 was considered as a base glass and the effect of various compositional substitutions on the expansion and solubility thereof studied. The composition of Example 20 expressed in mole percent is 70% B$_2$O$_3$, 20% CaO, and 10% BaO. Table V lists a number of molar substitutions made for B$_2$O$_3$ along with measurements of coefficient of thermal expansion over the range 25°–300° C. ($\times 10^{-7}$/° C.) and weight loss (mg/cm$^2$) after immersion in distilled water for 24 hours at room temperature and at 95° C., and in aqueous 1N HCl solution for 4 hours at room temperature and at 95° C.

TABLE V

| Example No. | Molar Substitution | Exp. | H$_2$O R.T. | H$_2$O 95° C | HCl R.T. | HCl 95° C |
|---|---|---|---|---|---|---|
| 20 | None | 68.0 | 2.3 | 79 | 14 | 191 |
| 21 | 5% P$_2$O$_5$ | 75.2 | 2.9 | 47 | 29 | 248 |
| 22 | 5% SiO$_2$ | 69.4 | 0 | 29 | 32 | 122 |
| 23 | 10% SiO$_2$ | 70.5 | 0 | 21 | 34 | 134 |
| 24 | 5% Al$_2$O$_3$ | 69.7 | 0 | 38 | 35 | 122 |
| 25 | 10% Al$_2$O$_3$ | 61.9 | 0 | 22 | 36 | 165 |
| 26 | 5% ZnO | 75.0 | 0 | 30 | 27 | 173 |
| 27 | 5% Li$_2$O | 68.4 | 0 | 26 | 13 | 133 |
| 28 | 5% Na$_2$O | 80.6 | 0 | 39 | 19 | 151 |

As illustrative of glass compositions suitable as body glasses in the inventive method, three glasses commercially marketed by Corning Glass Works, Corning, New York were chosen. The nominal compositions of those glasses, viz., Corning 9068, Corning 0137, and Corning 8092, are recited in Table VI along with a number of physical property measurements determined in the conventional manner. The liquidi values reported represent the internal liquidus expressed in ° C. Corning 9068 glass is representative of glasses in the alkali metal, alkaline earth metal silicate field; Corning 0317 glass is representative of glasses in the alkali metal aluminosilicate field; and Corning 8092 glass is representative of glasses in the alkali metal, alkaline earth metal, zinc silicate field.

TABLE VI

| | 9068 | 0317 | 8092 |
|---|---|---|---|
| SiO$_2$ | 62.9 | 61.2 | 62.5 |
| Al$_2$O$_3$ | 2.0 | 17.0 | 2.8 |
| B$_2$O$_3$ | — | — | 0.9 |
| Na$_2$O | 7.1 | 12.9 | 8.4 |
| K$_2$O | 8.8 | 3.4 | 9.3 |
| MgO | 0.9 | 3.5 | 2.9 |
| CaO | 1.8 | 0.4 | — |
| SrO | 10.2 | — | — |
| BaO | 2.4 | — | — |
| ZnO | — | — | 11.6 |
| PbO | 2.3 | — | — |
| TiO$_2$ | 0.5 | 0.8 | 0.7 |
| CeO$_2$ | 0.2 | — | — |
| Sb$_2$O$_3$ | 0.4 | — | 0.5 |
| As$_2$O$_3$ | 0.2 | 0.8 | 0.1 |
| F | 0.3 | — | — |
| S.P. | 687 | 873 | 739 |
| A.P. | 501 | 624 | 539 |
| St.P. | 459 | 576 | 497 |
| Exp. | 99.1 | 87.9 | 94.4 |
| Liquidus | 850 | 1040 | 609 |

The appended drawing depicts the viscosity curves of Example 20 and Corning glasses 9068, 0317, and 8092. The internal liquidus of Example 20 was measured to be about 898° C.

Cullet of Example 20 and the Corning glasses was melted and streams of the fluid glasses brought together in pairs in a downdraw apparatus to form cane having a core portion of a Corning glass and an encompassing skin of Example 20. Each glass was at a temperature at which its viscosity was about 1000 poises. The cane had a core portion of about 0.2 inch in diameter with a skin portion of about 0.008 inch in thickness. For property measurement comparison purposes, cane was also made from the Corning glasses without fusing the borate glass skin thereto.

The borate skin glass was removed from a number of samples by immersing the cane in an aqueous 1N HCl solution for about one hour at room temperature. The glass surface exhibited a polished appearance. Several of the composite cane samples were subjected to a thermal tempering process which involved placing the samples on a wire mesh, heating them to just below the softening point of the body glass, and then chilling rapidly with a blast of air.

Table VII tabulates modulus of rupture measurements performed on the cane samples wherein the body glass consisted of Corning 9068 utilizing techniques well-known to the art. No special precautions in handling were taken to avoid accidental abrasion of the samples before being measured. The recorded values represent the average of five samples.

TABLE VII

| Cane Description | Average Diameter | Modulus of Rupture |
|---|---|---|
| As formed | 0.17" | 29,900 psi |
| As formed-Skin removed | 0.16" | 25,100 psi |
| Tempered | 0.17" | 51,300 psi |
| Tempered-Skin removed | 0.16" | 35,500 psi |

Table VII is noteworthy in illustrating that the body retained relatively high strength even after the skin glass was removed.

Cane samples were prepared in like manner utilizing cullet of Example 20 and that of Corning 0317 glass. Two separate runs were made and the modulus of rupture values determined are recited in Table VIII. Again, the values reported represent an average of several samples. After the skin glass had been dissolved away, the surface of the body glass showed a white powdery appearance which was readily washed or wiped off to leave a polished surface.

In view of the fact that the strength of the body glass after the skin glass has been dissolved away was significantly improved over that of the body glass when formed alone, it was questioned whether a very thin layer of skin glass remained on the surface after the standard one-hour acid treatment. To investigate that possibility, one set of samples was immersed for an additional 2½ hours and another set immersed for an additional four hours. Table VIII notes that the strength values did not change significantly, thereby indicating that all the skin glass had in fact been removed during the first one-hour treatment.

Another factor which was thought might be influencing the improvement in strength seen in the body glass after the skin glass had been removed therefrom was the possibility that the acid treatment could be fortifying the cane. Table VIII, however, clearly indicates that no acid fortification is taking place since the body cane alone, when formed and subjected to the acid treatment, demonstrated the lowest strength of any of the samples. As was observed above when the skin glass was removed, the body glass surface manifested a white powdery appearance which could be easily wiped or washed off.

That the strength enhancement imparted to the body glass is essentially permanent after the skin layer is dissolved can be seen from Table VIII. Thus, a set of cane samples was exposed at room temperature to an atmosphere of dry argon gas for 30 days and a second set of samples was exposed at room temperature to the ambient atmosphere for 30 days. That the strength does not deteriorate with age is demonstrated since the modulus of rupture values measured on those samples was not substantially different from those of the newly formed material.

TABLE VIII

| First Run | | |
|---|---|---|
| Cane Description | Average Diameter | Modulus of Rupture |
| Body glass alone | 0.26" | 19,300 psi |
| Body glass alone - tempered | 0.25" | 23,400 psi |
| Composite - as formed | 0.20" | 28,950 psi |
| Composite - as formed - tempered | 0.14" | 42,770 psi |
| Composite - tempered | 0.18" | 20,410 psi |
| Composite - tempered - skin removed | 0.15" | 43,020 psi |
| Composite - as formed - skin removed - aged in argon | 0.16" | 39,040 psi |
| Composite - as formed - skin removed - aged in air | 0.17" | 41,040 psi |
| Body glass alone - 1N HCl, one hour | 0.25" | 14,990 psi |
| Second Run | | |
| Cane Description | Average Diameter | Modulus of Rupture |
| Composite - as formed | 0.19" | 25,180 psi |
| Composite - as formed - skin removed | 0.15" | 44,720 psi |
| Composite - as formed - skin removed - in acid extra 2½ hours | 0.16" | 47,190 psi |
| Composite - as formed - skin removed - in acid extra 4 hours | 0.16" | 42,690 psi |
| Composite - tempered | 0.18" | 24,500 psi |
| Composite - tempered - skin removed | 0.16" | 47,310 psi |
| Composite - tempered - skin removed In acid extra 4 hours | 0.16" | 51,370 psi |

Another set of cane samples was produced in like manner employing cullet of Example 20 (the composition included 0.1% by weight $Co_3O_4$ to add color to the glass) and that of Corning 8092. As is described in Table IX, the glass samples were divided into two groups prior to testing for modulus of rupture. Thus, one group was immediately subjected to testing whereas the second was subjected to intentional surface abrasion before testing. The purpose for exposing the cane to abrasion was to simulate abuse the glass would receive under conditions of actual service. The abrasion procedure consisted of placing the cane samples in a container, filling the container with 30 grit SiC, and then revolving the container for 15 minutes.

The strength values reported in Table IX again reflect an average of several samples in each instance.

TABLE IX

| Cane Description | Average Diameter | Abraded | Modulus of Rupture |
|---|---|---|---|
| Body glass alone | 0.23" | No | 17,240 psi |
| Body glass alone | 0.25" | Yes | 11,060 psi |
| Composite - as formed | 0.16" | No | 36,920 psi |
| Composite - as formed | 0.16" | Yes | 38,780 psi |
| Composite - as formed - skin removed | 0.15" | No | 34,390 psi |
| Composite - as formed - skin removed | 0.16" | Yes | 9,770 psi |
| Composite - tempered | 0.17" | No | 40,500 psi |
| Composite - tempered - skin removed | 0.15" | No | 44,340 psi |

Table IX illustrates two significant features. First, the improvement in strength imparted to this pair of glasses through thermal tempering was minimal. Second, surface abrasion eliminates essentially all of the strength enhancement once the skin glass is removed.

Although the explanation for the unusual strengthening effects noted in the above examples is not fully comprehended, they are believed to be the result of ion exchange. In the customary ion exchange reaction, however, there is normally a compositional gradient at the interface. Such circumstances could result in a poorly polished surface when the skin glass is dissolved away. But the skin and body compositions are so chosen that that phenomenon does not occur. Rather, the body and skin glasses are selected such that the migratable ions in the skin will enhance the durability of the body, and the migratable ions in the body will enhance the solubility of the skin. Simultaneously with the exchange, the coefficient of thermal expansion of the surface layer of the body glass will be lowered. For example, the three Corning glasses utilized as body glasses in the exemplary compositions above contained substantial amounts of alkali metal ions, whereas Example 20 was alkali metal free and contained $Ca^{+2}$ ions. When the glass layers were laminated together at elevated temperatures, $Ca^{+2}$ ions from the skin glass migrated into the body and $Na^+$ ions from the body glass diffused into the skin layer. Another example of an operable ion exchange could involve a skin glass containing alkali metal ions having a small ionic radius (e.g. $Li^+$) and a body glass containing alkali metal ions having a larger ionic radius (e.g., $Na^+$ or $K^+$). When the layers are laminated together, the $Li^+$ ions will move into the body glass and the larger ions into the skin. The presence of $Li^+$ ions will commonly produce a surface layer on the body glass having a lower coefficient of thermal expansion than the original $Na^+$ or $K^+$-containing glass.

It will be appreciated that additional ion exchange can occur when the laminated article is subjected to a further forming or re-forming step. Thus, when the composite article is heated to a temperature between the annealing and softening points of the glasses, it can be shaped into an article of a desired geometry while simultaneously causing an exchange of ions to take place between the laminae.

Finally, as can be observed, the use of body glasses having compositions within the alkali metal aluminosilicate field or within the alkali metal, alkaline earth metal, zinc silicate field is preferred where high strength articles are desired.

I claim:

1. A method for forming strengthened glass articles having surfaces which are essentially defect free and equivalent in smoothness to polished surfaces which comprises the steps:
   (a) two glass-forming batches of different compositions are melted, one batch for a glass which is highly soluble in a given solvent and the second for a glass which is relatively insoluble in the same solvent;
   (b) the molten batches are simultaneously brought together while in the fluid state, that is, having viscosities no greater than about 250,000 poises, to form a laminated glass body wherein the insoluble glass is essentially completely enclosed within the soluble glass;
   (c) the laminae are fused together at a temperature where the melts are in fluid form to provide an interface therebetween which is defect free and to cause an exchange of ions to take place at said interface between said insoluble glass and said soluble glass, the composition of the soluble glass being selected such that there is essentially no composition gradient at said interface but the migratable ions thereof enhance the chemical durability of the insoluble glass and cause the production of a surface layer on the insoluble glass having a coefficient of thermal expansion lower than that of the insoluble glass, and the composition of the insoluble glass being selected such that the migratable ions thereof enhance the solubility of the soluble glass;
   (d) the laminated article is cooled; and then
   (e) the soluble glass layer is dissolved away in a solvent wherein it is at least 10 times more soluble than the insoluble glass.

2. A method according to claim 1 wherein said laminated article is heated to a temperature between the annealing and softening points of the laminae, shaped into an article of a desired geometry while simultaneously causing a further exchange of ions to take place at said interface between said insoluble glass and said soluble glass, cooled, and then the soluble glass layer dissolved away in said solvent.

3. A method according to claim 1 wherein said soluble glass layer has a borate-based composition and said relatively insoluble glass has a composition selected from the group of alkali metal aluminosilicate glasses and alkali metal, alkaline earth metal, zinc silicate glasses.

4. A method according to claim 1 wherein said solvent is water or a dilute, aqueous acid solution.

* * * * *